(12) United States Patent
Taylor et al.

(10) Patent No.: US 9,068,879 B2
(45) Date of Patent: Jun. 30, 2015

(54) TOWER CASSETTE

(75) Inventors: Ian Taylor, Warwickshire (GB); Hugh Connell, Worcestershire (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 352 days.

(21) Appl. No.: 13/811,767

(22) PCT Filed: Jul. 27, 2011

(86) PCT No.: PCT/US2011/045548
§ 371 (c)(1),
(2), (4) Date: Jan. 23, 2013

(87) PCT Pub. No.: WO2012/015930
PCT Pub. Date: Feb. 2, 2012

(65) Prior Publication Data
US 2013/0118815 A1 May 16, 2013

(30) Foreign Application Priority Data
Jul. 28, 2010 (GB) .................. 1012642.3

(51) Int. Cl.
*B41J 2/01* (2006.01)
*G01G 23/18* (2006.01)
*B41J 3/407* (2006.01)
*B41J 3/44* (2006.01)
*B41J 15/04* (2006.01)

(52) U.S. Cl.
CPC .............. *G01G 23/18* (2013.01); *B41J 3/4075* (2013.01); *B41J 3/445* (2013.01); *B41J 15/042* (2013.01); *B41J 15/044* (2013.01)

(58) Field of Classification Search
CPC ........................................... G01G 23/18
USPC ........................................... 347/104
See application file for complete search history.

(56) References Cited

U.S. PATENT DOCUMENTS

| | | | | |
|---|---|---|---|---|
| 5,092,688 A * | 3/1992 | Haennelt et al. | ............. | 400/103 |
| 6,109,804 A | 8/2000 | Higashi et al. | | |
| 6,135,657 A * | 10/2000 | Martinez et al. | ............. | 400/208 |
| 6,839,533 B2 | 1/2005 | Ban et al. | | |
| 7,867,593 B2 * | 1/2011 | Hoshino et al. | ............. | 428/41.8 |

(Continued)

FOREIGN PATENT DOCUMENTS

| | | |
|---|---|---|
| EP | 1357447 A2 | 10/2003 |
| EP | 2009510 A1 | 12/2008 |

(Continued)

OTHER PUBLICATIONS

International Search Report and Written Opinion corresponding to PCT/US2011045548, dated Mar. 19, 2012.

(Continued)

*Primary Examiner* — Rodney Fuller
(74) *Attorney, Agent, or Firm* — Lowe Hauptman & Ham LLP

(57) ABSTRACT

A printer cassette device is arranged to be removably mounted to or inserted into a printing device of a weighing scale. The printer cassette device comprises a rotatable locking mechanism for rotational engagement with the printing device.

20 Claims, 8 Drawing Sheets

(56) References Cited

U.S. PATENT DOCUMENTS

| | | | |
|---|---|---|---|
| 7,953,351 B2 | 5/2011 | Isomura et al. | |
| 7,974,558 B2 | 7/2011 | Choi et al. | |
| 8,180,259 B2 | 5/2012 | Murakami et al. | |
| 8,647,002 B2* | 2/2014 | Terry et al. | 400/613 |
| 2009/0148222 A1* | 6/2009 | Terry et al. | 400/613 |
| 2011/0229241 A1* | 9/2011 | Takahashi | 400/611 |
| 2012/0026265 A1* | 2/2012 | Kawashima | 347/104 |
| 2013/0164069 A1* | 6/2013 | Delaney et al. | 400/582 |
| 2014/0320582 A1* | 10/2014 | Sauvage et al. | 347/218 |
| 2015/0002866 A1* | 1/2015 | Koike et al. | 358/1.6 |

FOREIGN PATENT DOCUMENTS

| | | |
|---|---|---|
| EP | 2012188 A1 | 1/2009 |
| EP | 2028559 A1 | 2/2009 |
| JP | 2009-014455 A | 1/2009 |
| WO | 2012015930 A2 | 2/2012 |

OTHER PUBLICATIONS

Search Report corresponding to GB1012642.3, dated Nov. 29, 2010.

Office Action corresponding to GB1012642.3, dated Nov. 7, 2012.

* cited by examiner

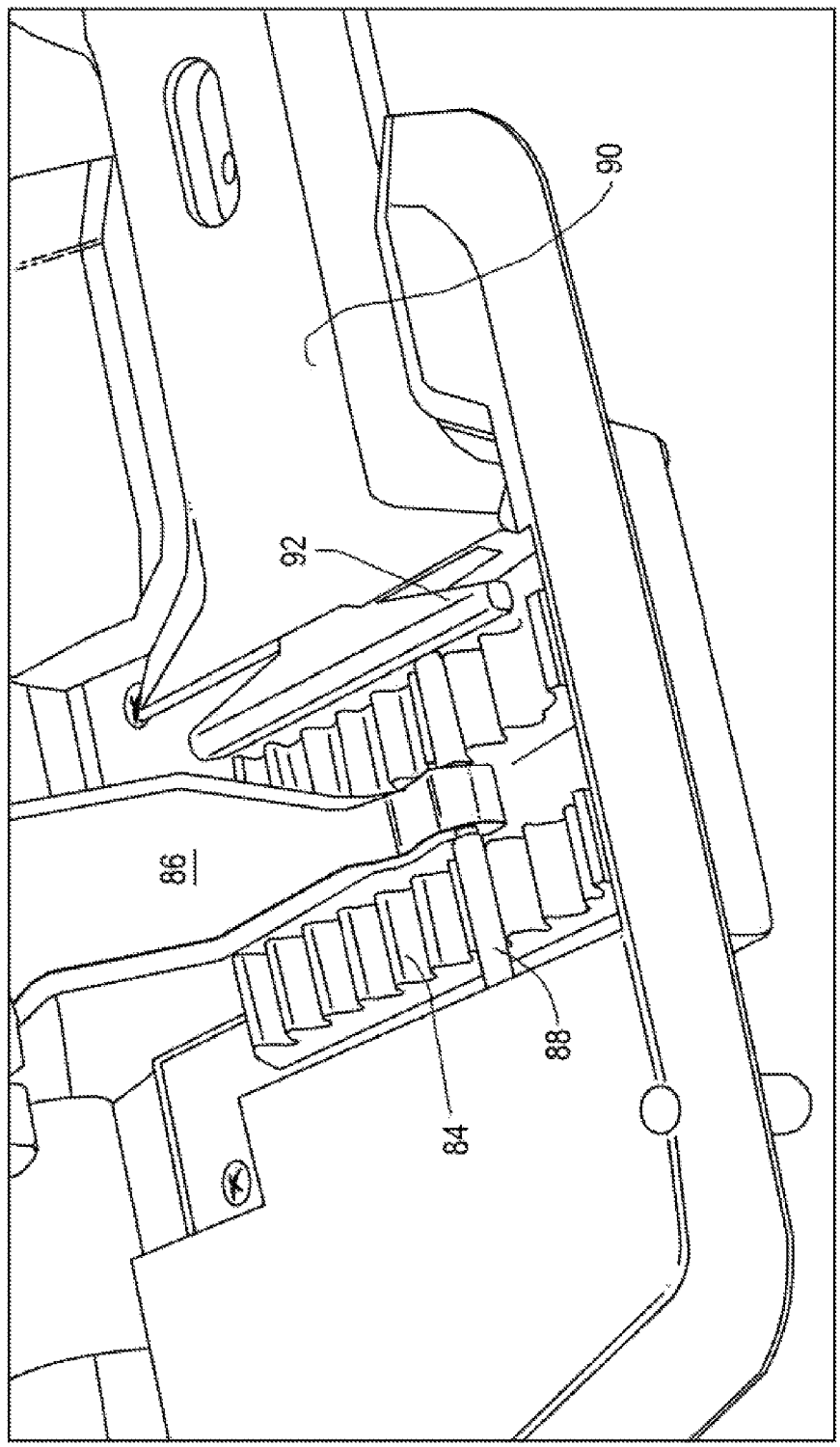

TOWER CASSETTE

RELATED APPLICATIONS

The present application is National Phase of International Application Number PCT/US2011/045548, filed Jul. 27, 2011, and claims priority from, British Application Number 1012642.3, filed Jul. 28, 2010.

FIELD OF THE INVENTION

The present invention relates to a printer device, more particularly but not exclusively a printer device for use in a weighing scale.

INTRODUCTION

Printer devices form an essential component of Point-Of-Serve or Point-Of-Sale (POS) terminal devices to print product related information on various printing media such as paper receipts or labels on a supply roll. For example, in a supermarket environment, commodity items such as fresh foods, e.g. fresh meat, fish, fruit and vegetables, are often sold by weight. Fresh food departments, such as deli departments in supermarkets which utilise slicers or the like to dispense food products from a bulk quantity, use weighing scales to weigh the dispensed product. Based on its price per unit weight, the scale calculates a sub-total price of the item or dispensed product. A printing device incorporated into the weighing scale at a point of serve then prints a label showing the sub-total price and/or a barcode which is scanned at a Point-of-Sale or check-out register. Print-of-serve or point of sale printer devices are not restricted to weighing scales and find use in many other devices/installations which involve providing the consumer or operator with a physical record of the purchase or sale, such as checkout tills, self-service checkouts, etc.

Dot matrix printers, thermal printers, and ink jet printers are all types of printer heads generally used in point or serve or point of sale devices because of their speed and reliability. Faster printing speeds at the point of serve or point of sale point are being made possible through the increasing use of thermal printing methods. Such faster printing speeds tend to result in an increased frequency in which printing media supply rolls must be replaced since more product related information can be added to the receipt/label, making each individual label, receipt etc., larger. The supply roll is usually held in a printer cassette or cartridge that can be inserted into and extracted from the printer device to allow the operator to change the roll with less effort whenever the printing medium runs out. The printing medium includes but is not limited to paper, labels releasably adhered in series at prescribed intervals on a roll of a backing paper, linerless print media in which the "front" side of a continuous print medium includes a release coating and the "rear" side a pressure sensitive adhesive, rather than using a separate release-coated backing paper.

Opening a printer cassette body to re-load a supply roll is one of the time consuming operations endured by an operator at a point of serve or point of sale. To address this issue Point of Serve or Point of Sale printer manufacturers have attempted to differentiate themselves from their competitors by providing features on POS printers that simplify the supply roll loading process. For example, many manufacturers have introduced POS printers with push-buttons that release elaborate latching mechanisms which open a supply roll access cover. In other printers, a printer cassette or cartridge containing a fresh supply roll is inserted into the printer body usually by a sliding motion and various latching mechanisms in the printer cassette and the printer device allow the free end of the print medium coming from the supply roll to be pinched between a pressure roller and the print head in one operation. However, although these elaborate latching mechanisms may simplify the supply roll loading process, these latching mechanisms add considerable cost and complexity to POS printers. Simplifying feeding of the free end of a supply roll between the drive roller and the print head and insertion of the printer cassette into the printer body has meant that the latching mechanisms needed are very complex and prone to damage. For example, a typical printer cassette includes a feed reel or hub for holding the supply roll, and a drive roller or capstan assembly to drive the free end of the supply roll to the print head. The drive roller assembly typically comprises a rubber drive roller and a metal pinch roller between which the labels are fed. Replacing an empty supply roll with a fresh supply roll usually requires manually feeding a free end of the roll through guides within the cassette from a feed reel/hub through the drive roller assembly and/or onto a take-up reel/hub or using elaborate latching mechanisms which engage with corresponding latching mechanism formed in the printer device. This results in a very complex printer cassette that is also very time consuming to load with a fresh supply roll and/or install in the printer; this being inconvenient to customers if carried out whilst they are waiting at a service counter or till. This problem is addressed by keeping at least one "spare" cassette which is loaded with a fresh supply roll "offline" whenever convenient, whilst the other cassette is "online", i.e. in use in the weighing scale. When the "online" cassette is exhausted, it can be simply exchanged for the full "offline" cassette, thereby minimising scale downtime. The now empty "offline" cassette can then be refilled before the "online" cassette runs out again. However, the number of printer cassettes that a supermarket or convenience store can hold is very much dependent upon their cost. They tend to be expensive due to the many different mechanical components which they contain. A typical label cassette as taught in JP2009014455 (Ishida Seisakusho) comprises a drive roller assembly, a take-up hub and a gear assembly to mechanically link both of these for driving engagement with drive means in the scale. All of these components are supported on a metallic chassis and housed in a plastic covering. In all cases, it is necessary to feed the free end of the supply roll between the drive roller and the print head or a pinch roller so as to drive the free end through the printer cassette device. The mechanism by which this is achieved when the printer cassette device is assembled with the printer body, is one of the challenges faced by manufacturers in an attempt to devise an easy loading printer cassette.

In an attempt to simplify printer cassettes and their associated drive and latching mechanisms without affecting the ease by which the supply roll can be changed, printers having a clamshell configuration have become very popular particularly with respect to handheld card reading devices and compact printing devices such as Electronic Fund Transfer (EFT) devices. Such clamshell printers comprise a housing having a base and a cover pivotably hinged together by hinge pin in a "clamshell" configuration. A roller usually of rubber is mounted at the end of the cover such that when the cover is brought towards the base by rotating the cover about the hinge pin, the free end of the paper is pinched in a compression fit between the rubber roller and either a holding roller or the print head so that the free end is fed to the print head under sufficient tension during a printing process. The base usually has a part-cylindrical depression for accommodating the supply roll. The upper edge of the cylindrical depression defines a guide surface for guiding the free end of the supply roll over the print head. To change the supply roll, the operator simply pivots the cover open and places the roll on the base such that it sits in the cylindrical depression. The free end of the roll is then pulled over the print head or holding roller and the cover is closed so that roller at the end of the cover pinches the free end between the roller and the print head in a compression fit. However, due to the fact that the supply roll simply sits in the cylindrical depression, such printers are only usable in the normal upright position otherwise there is a risk that the supply roll will fall out of the housing or cause an interruption to the normal feeding pattern of the paper through the printer. Moreover, as the paper is taken up from the roll causing the supply roll to rotate, the exterior surface of the roll rubs against the interior wall of the base. The force necessary to pull the paper over the print head to cause the supply roll to rotate therefore needs to overcome the friction between the exterior surface of the roll and the interior surface of the base upon which the supply roll is seated. Such clamshell printers have only found uses in a limited number of applications where there is no excessive printing necessary such as the handheld EFT devices described above. Clamshell printers are therefore not generally appropriate for use as a printing device for a point of serve or point of sale terminal in a supermarket or grocery store.

Therefore, what is needed is a printer assembly comprising a printer cassette that can be removably mounted to or inserted into a printer device for a point of serve or point of sale device that possess the benefits of a clamshell printer in terms simplicity in design and ease of replacing an expended supply roll and yet also possess the printing speed, robustness and reliability of point-of-serve or point-of-sale printer devices currently in use.

SUMMARY OF INVENTION

The present applicant has overcome the above problems by providing a printer cassette arranged to be removably mounted to or inserted into a printer device of a weighing scale characterised in that the printer cassette comprises a rotatable locking mechanism for rotational engagement with the printer device. Whereas prior art printer cassette systems necessitate a sliding operation to lock onto the printer device, in the present invention the locking operation is simply achieved by a rotational action. This provides the advantage that the printer cassette can be locked onto the printer device in one operation by a twist action of the operator's hand rather than a pushing action. Preferably, the printer cassette device is arranged to rotatably support a supply roll when mounted to or inserted into a printer device. Optionally, the printer comprises a pivot member for rotatably supporting a supply roll. For example, the pivot member can be in the form of protuberances from the inner side wall of the printer cassette and the printer device which align when the printer cassette is mounted to the printer device so as to rotatably support the ends of the supply roll. Alternatively, the pivot member is a pin, the pin defining an axis of rotation of the supply roll.

The rotational locking mechanism for rotational engagement may operate by rotation of the pin such that rotation of the pin in one direction locks the printer cassette to the printer device and rotation of the pin the other direction unlocks the printer cassette from the printer device. This can either be by rotation of the printer cassette in the case where the pin is cantilevered from the inner side wall of the printer cassette having a fixed end and a free end such that rotation of the printer cassette in one direction locks the printer cassette to the printer device and rotation of the printer cassette in the other direction unlocks the printer cassette from the printer device or alternatively, by making the pin rotate relative to a body of the printer cassette, e.g. by being mounted in a bearing and rotated by means of a handle. Preferably, the rotational locking mechanism comprises a locking member at the distal end of the pin for rotational engagement with a corresponding locking member in the printer device. Using the pin to lock the printer cassette onto the printer device removes the need to provide a separate locking mechanism. Optionally, the rotational locking mechanism is a twist lock. For example, the twist lock could comprise a T-shaped head receivable in a rectangular slot. The locking member may further comprise a locating member for guiding the locking member into engagement with its corresponding locking member. This ensures that the locking member is properly aligned into engagement with its corresponding locking member if the printer cassette device is moved towards the printing device at an angle. In addition or alternatively to the locking member formed at the distal end of the pin, other rotational locking mechanisms can be used such as a bayonet type connector for locking the printer cassette body onto the printer device comprising a male side with one or more locking pins and a female receiving portion with matching L slots and preferably with spring(s) or other resilient parts to keep the printer cassette device locked to the printer body.

Preferably the printer cassette is substantially cylindrical to provide a space saving housing for accommodating the supply roll. More preferably, the printer cassette is adapted to mate with a corresponding substantially circular or cylindrical part provided in or on the printing device. Optionally, the printer cassette is substantially transparent. This allows the user or operator to determine the amount of printing medium on the supply roll without the need to disassemble the printer cassette from the printer device body.

Instead of a sliding operation to assemble the printer cassette with the printer device found in a majority of prior art printer cassette device assemblies which in a majority of cases requires complex latching systems, the present applicant has realised that the use of a rotational locking mechanism reduces or substantially eliminates the need for any elaborate latching mechanism for assembling the printer cassette with the printer device and clamping the free end of the supply roll between a roller and the print head. Whereas in a sliding operation, a mechanical latch mechanism is needed to cause the free end of the supply roll to be pinched between the roller and the print head, in the present invention, pinching of the free end of the supply roll is made by the manual rotation of the printer cassette device on or in the printer device, thereby removing any need for a complex latching mechanism. Preferably, the printer cassette comprises a pressure roller (e.g. a drive roller) or a print head which respectively engages with a print head or a pressure roller mounted on the printer device in a compression fit by a rotational engagement between the printer cassette and the printer device. To load the printer cassette of the present invention with a fresh supply roll, the supply roll is simply placed over the pin so that the pin is received within the core of the supply roll. A free end of the supply roll is pulled over the pressure roller or printer head depending upon whether the printer cassette device comprises the pressure roller or print head so as to expose a portion of the print medium extending from the printer cassette such that when the printer cassette is assembled with the printer device and rotated to lock the printer cassette to the printer device, the free end of the supply roll is pinched between the pressure roller and the print head. Moreover, the pin for supporting the supply roll removes any need for the exterior of the supply roll to rub against an interior side wall of the printer cassette since the supply roll is suspended on the pin and therefore any friction that previously existed between the exterior surface of the supply roll and the interior side wall of the cassette has been removed. Secondly, the pin supports the supply roll in any orientation of the printer cassette as well as ensuring that the leading edge of the supply roll is sufficiently aligned so that it is properly guided over the print head.

To prevent the supply roll from sliding off the pin, thereby ensuring centring of the supply roll such that leading edge of the free end of the supply roll is maintained in correct alignment with the print head, the pin may further comprise a stop. Moreover, the stop prevents the supply roll from sliding across the pin and rubbing against the interior side wall of the printer device during rotation. Preferably, the stop comprises a step for butting against the side of the supply roll.

Preferably the printer cassette comprises a handle to manually rotate the printer cassette between a locked and an unlocked position on the printer device. More preferably, the handle has an ergonomic design to comfortably fit the user's or operator's hand during rotation of the printer cassette device without imparting excessive strain on the user's wrist. Preferably, at least one portion of a shaft on which the pressure roller is mounted is rotatably set in a slot in the printer cassette, the roller being moveable along the slot. Movement of the roller shaft portion along the slot provides the pressure roller with sufficient play for cooperation with a detent slot in the printer device. Preferably, at least one end of the pressure roller shaft snap-fits in the detent slot in the printer device. Optionally, the detent slot has a retaining lip to serve to rotatably retain the roller once inserted in the detent slot. Preferably, the detent slot has an angled portion. Thus as one end of the shaft enters an open end of the detent slot, the pressure roller butts up on and compresses against the print head by virtue of the resilient rubber material forming the roller. On further rotation of the printer cassette against the printer device, the angled portion of the detent slot causes the end of the shaft to change direction such that de-compression of the pressure roller forces the end of the shaft to move away from the print head to be retained in the detent slot as a snap fit. This snap fit engagement also serves as a detent restraining relative rotation between the printer cassette and the printer device, thereby retaining the locking members of the rotational locking mechanism in engagement.

Preferably a positioning member is moveable against a bias so that it butts up against the roller and positions the roller shaft portion in the printer cassette slot for proper alignment and co-operation with the open end of the detent slot. To prevent the positioning member permanently being biased against the roller thereby hindering it from freely rotating when assembled with the printer device, the biasing means may further comprise an actuator operatively connected to the positioning member and which is adapted to cooperate with the printer device such that when the printer cassette is assembled with the printer device in the locked position, the positioning member is moved away from the roller and when unlocked from the printer device the actuator allows the positioning member and pressure roller to be biassed into contact.

The supply of print medium is often wound around a hollow cylindrical core. These cores come in a range of diameters to suit the various thicknesses and/or quantities of the print medium wound on the core. For example, linerless media usually have a larger core diameter than paper rolls destined for printing receipts. Traditionally, to cater for the different core diameters, separate interchangeable core adapters have been used. In the present invention, the printer cassette advantageously comprises a pivotable core adapter, in which the core adapter is pivotable from an erect position for rotatably supporting the supply roll in the printer cassette device, to a stowed position. The core adapter cooperates with the pin in the erect position for supporting a supply roll having a greater core diameter than that supported by the pin alone. Preferably, the core adapter is substantially U-shaped, having a moveable locking arm at its distal end. The locking arm may be moveable from a first position in which the pin is allowed to move through the core adapter, to a second position in which the core adapter is supported by the pin and is thereby secured from movement. For example, the pin is cantilevered out from an inner side wall of the printer cassette (so as to have a fixed end and a free end) and the core adapter is hingedly mounted to the side wall by the bottom of the U, adjacent the pin fixed end, so that the limbs of the U straddle the pin as the core adaptor is moved between the erect and stowed positions. The stop at the free end of the pin, secures the locking arm to the pin. Preferably, the core adapter is substantially parallel to the pin in the erect position and substantially perpendicular to the pin in the stowed position.

In one embodiment, a weighing scale comprises a printer device for cooperating with a printer cassette as described above. Optionally, the printer device is mounted on a column such that in a normal upright position of the weighing scale, the printer device is elevated above the weighing scale. Preferably, the weighing scale comprises a display unit pivotably mounted to the column and indexing means for orientating the display unit at a desired orientation. More preferably, the indexing means is a ratchet mechanism. The indexing means may further comprise a releasable locking mechanism arranged to lock the display unit at the desired orientation and releasable to permit the display unit to pivot.

Typically, a portion of the display unit for a weighing scale comprises a display panel in the form of a touch sensitive screen and a separate keyboard panel to accommodate key options that are fixed such as a QWERTY key pad. In the present invention, an overlay for the keyboard panel is slideable in the display unit. Preferably, the keyboard panel comprises a tray for receiving the keyboard overlay, the tray with overlay being receivable in a slot in the display unit so that the keyboard overlay can be interchangeable.

The weighing scale may be a hanging weighing scale. Alternatively, the weighing scale may be a desk top weighing scale.

DETAILED DESCRIPTION

Further features and aspects of the present invention will be apparent from the following detailed description of an illustrative embodiment, made with reference to the drawings, in which:—

FIG. 1 is a perspective view of the display unit of a weighing scale comprising a printer cassette according to an embodiment of the present invention, FIG. 2 is a perspective view of the rear face of the printer cassette showing the central pin for supporting the supply roll, FIG. 3 is a perspective view of the printer device showing the locking member for rotational engagement with the printer cassette shown in FIG. 2.

Figure 5:
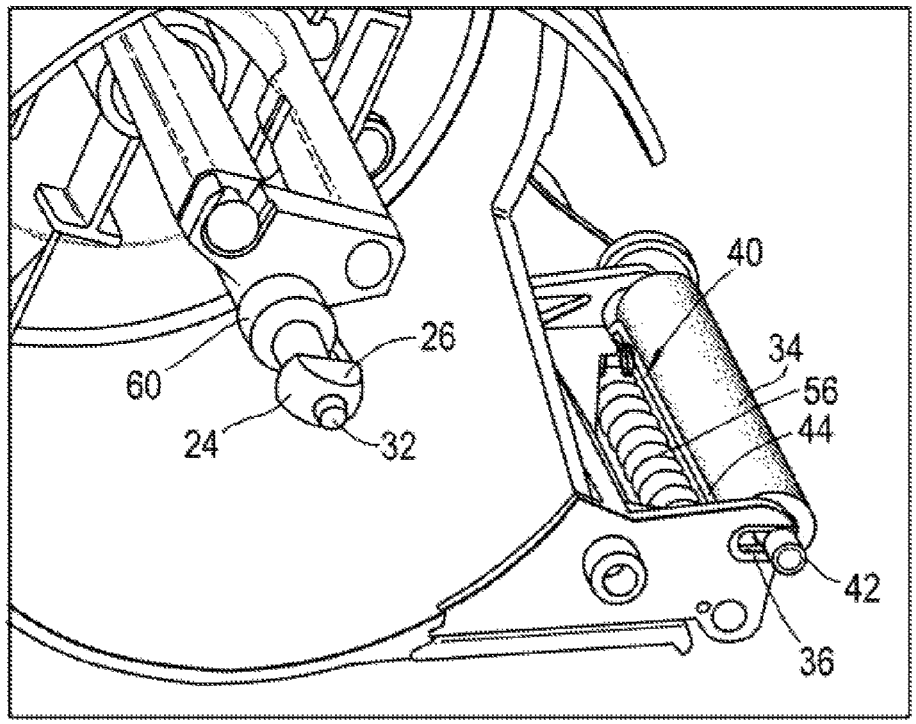
FIG. 5 is an expanded view of the printer cassette showing the pressure roller mechanism.
Figure 7:
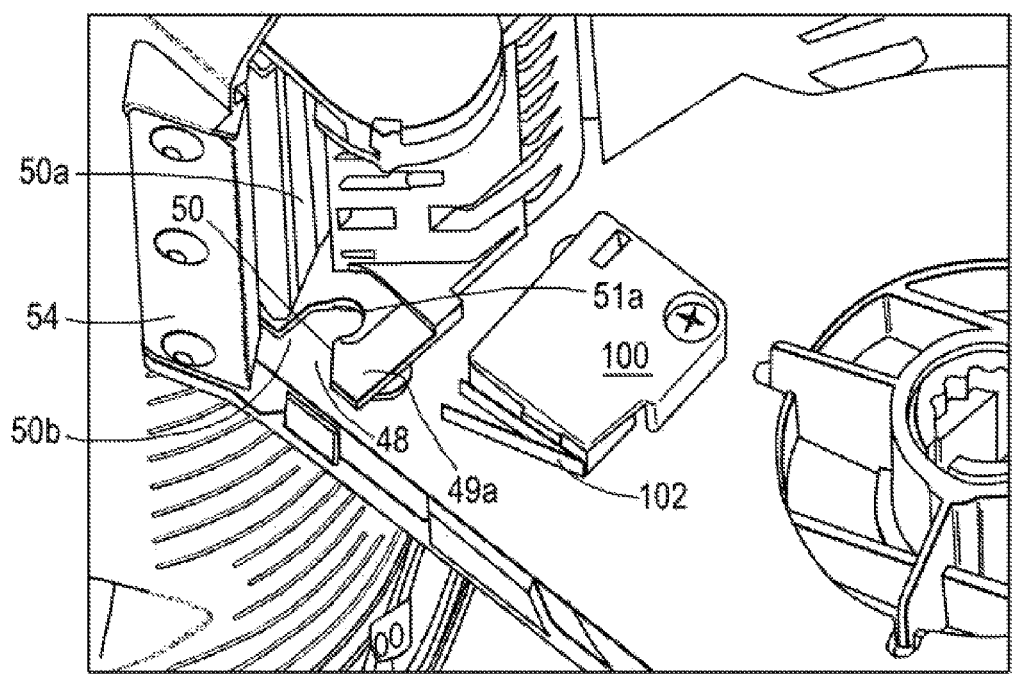
Figure 8:
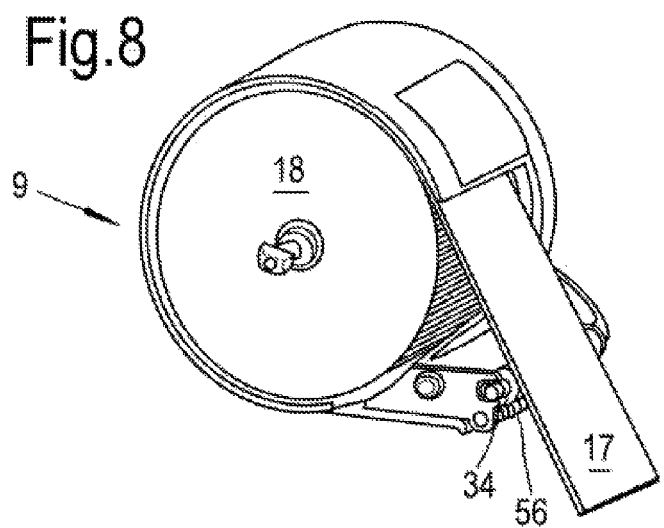
Figure 9:
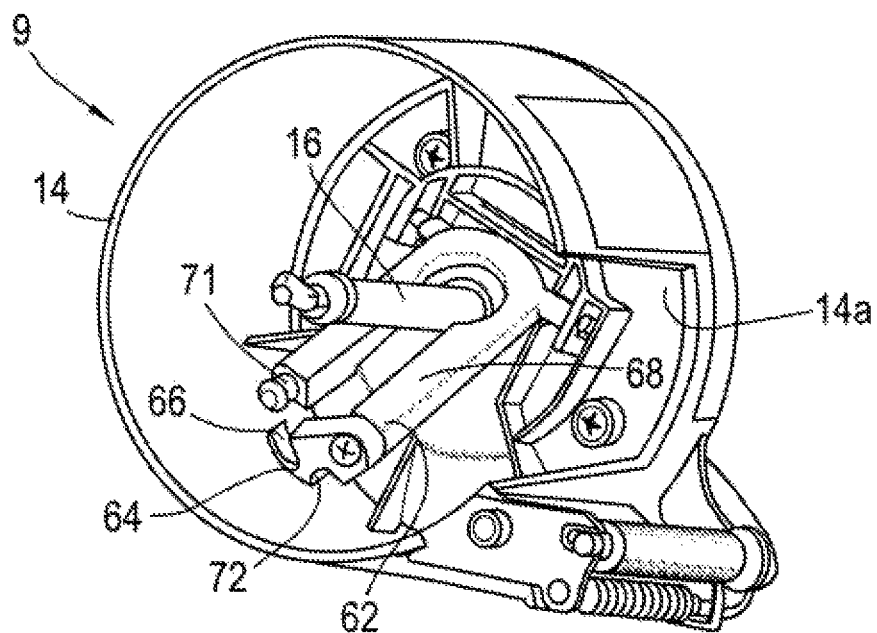
Figure 10:
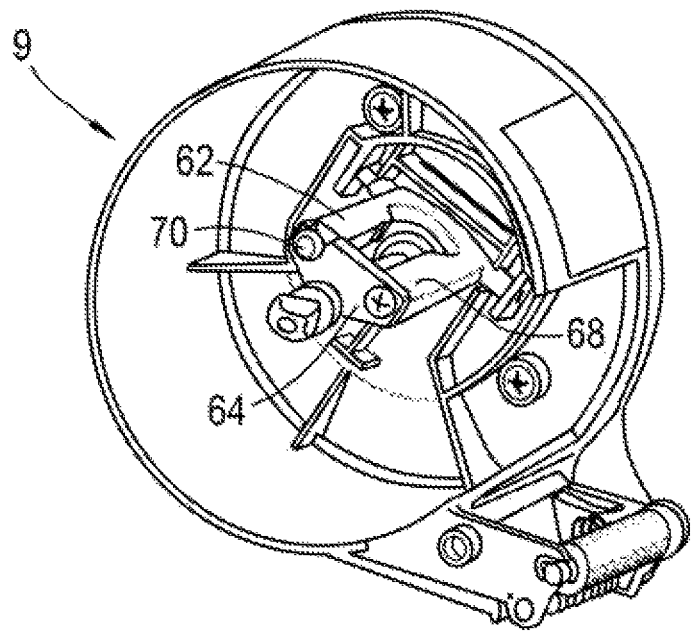
Figure 11:
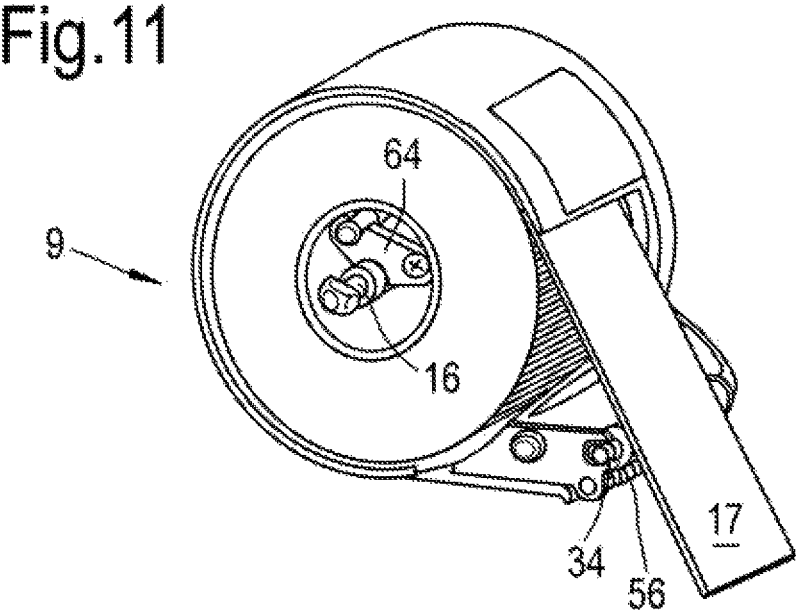
Figure 12:
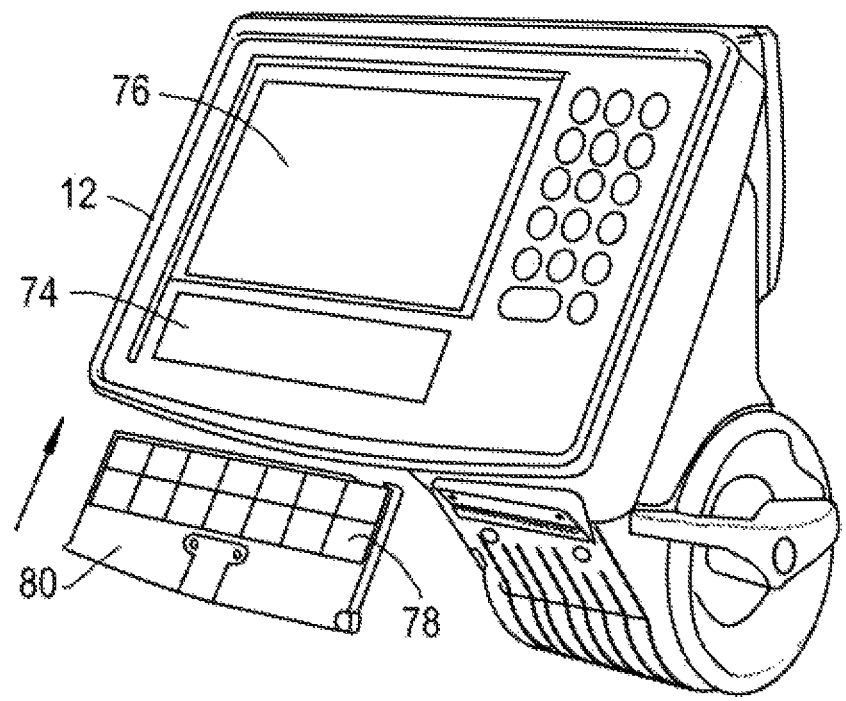

FIG. 7 is an expanded view of the detent slot in the printer device adapted for receiving at least one end of the drive roller shown in FIG. 5, FIG. 8 is a perspective view of the rear face of the printer cassette showing a supply roll supported on the central pin, FIG. 9 is perspective view of the rear face of the printer cassette showing the pivotally mounted core adapter, FIG. 10 is a perspective view of the printer cassette showing the pivotally mounted core adapter in the erect position, FIG. 11 is a perspective view of the printer cassette showing a supply roll supported on the pin and core adapter, FIG. 12 is a perspective view of the display unit showing insertion of the fixed keyboard tray and overlay in the display unit.

Figure 13:
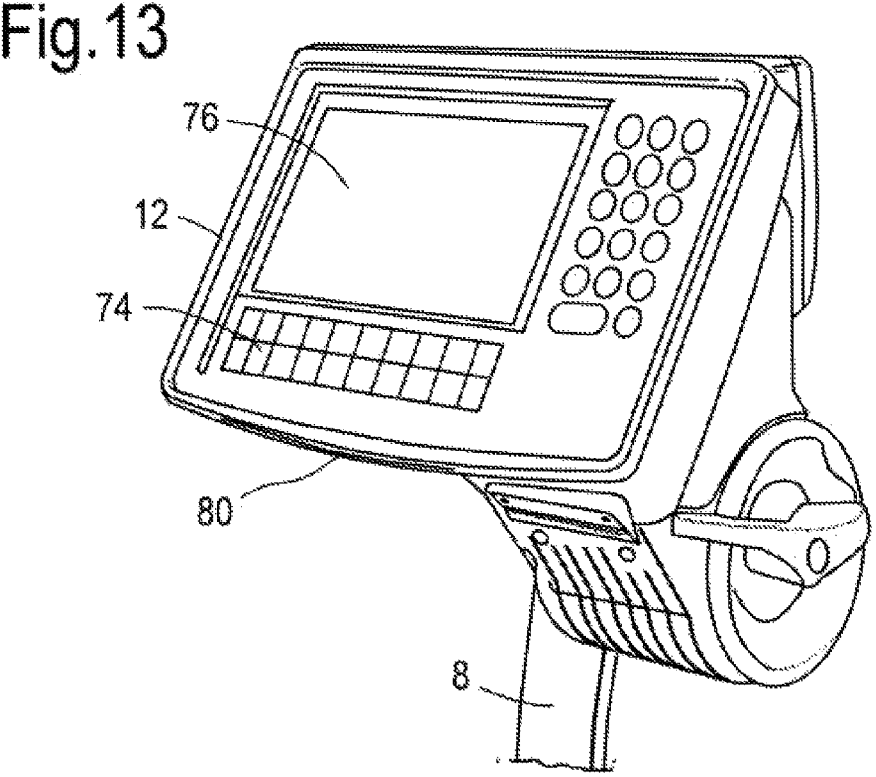

FIG. 13 is a perspective view of the fixed keyboard panel with the tray and overlay inserted in the display unit.

Figure 14:
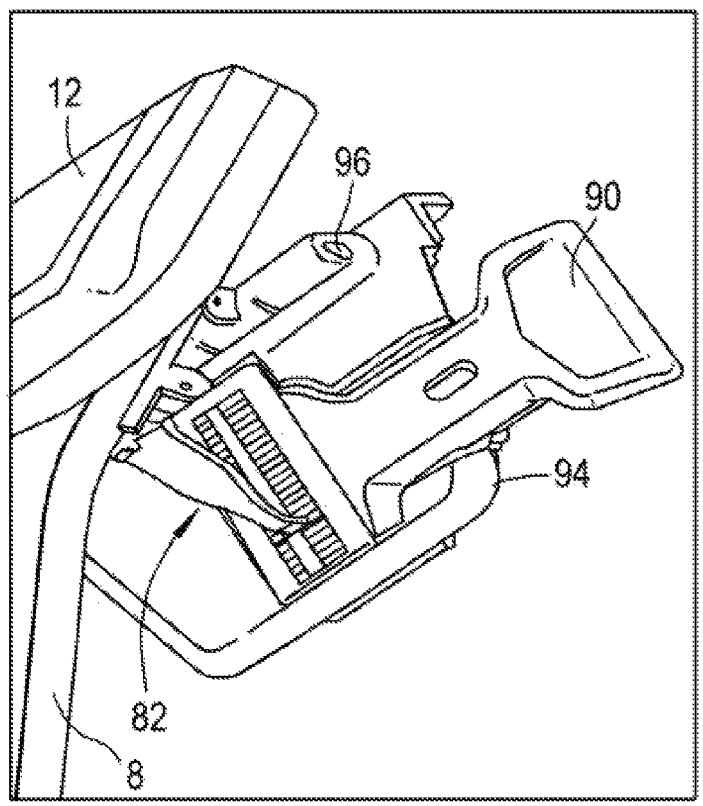

FIG. 14 is a perspective view of the ratchet mechanism of the display unit.

FIG. 15 is a perspective view of the locking mechanism of the ratchet mechanism in FIG. 14.

Figure 1:
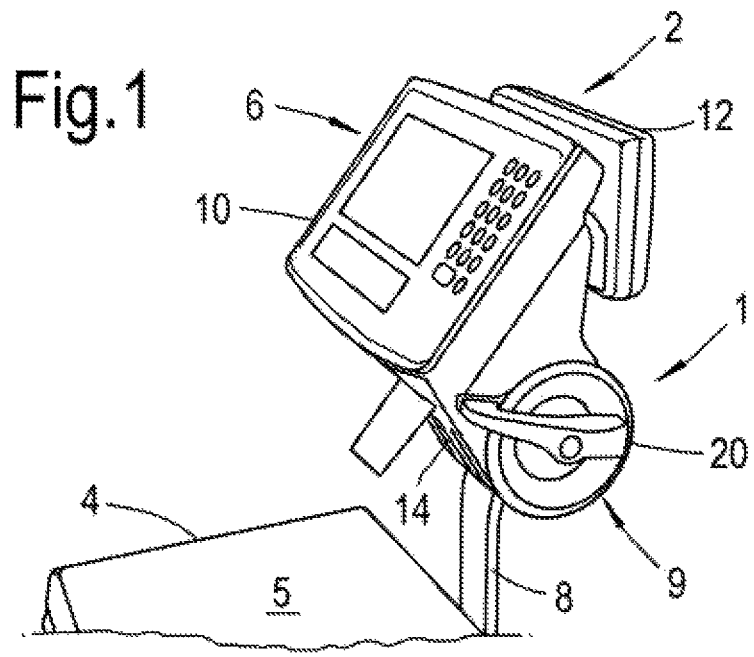

In the particular the embodiment shown in FIG. 1, the printer 1 is incorporated into a weighing scale 2 having a display unit 6 and a base unit 4 comprising a weigh pan or platform 5. The particular weighing scale shown in FIG. 1 has a "tower" configuration whereby the display unit 6 is elevated above the base unit by being mounted on a column 8 so that the display unit is at eye level during use. This "tower" arrangement has become particularly popular in weighing scales due to the ease by which the user or operator and/or the customer can view the display unit 6 to the extent that it has become widely adopted in most supermarket stores, grocery stores etc. In the particular embodiment shown in FIG. 1, the display unit 6 comprises an operator display unit 10 and a consumer display unit 12. The compactness of the printer having a limited number of moving parts increases the flexibility with which the printer can be positioned or orientated on the weighing scale. This in turn increases the flexibility by which the weighing scale can be designed as there is no restriction to the positioning of the printer cassette which accordingly can be located to areas of the weighing scale which were previously impractical due to its particular design or size. In the particular embodiment shown in FIG. 1, the printer 1 is attached adjacent to the display unit 6 and is thereby elevated above the base unit 4 by being mounted to the column. The greater number of moving parts in prior art printer devices has meant that the volume occupied by the printer device is too large to be located anywhere else on the weighing scale besides in the base unit. However, the position and the orientation of the printer 1 is not restricted to that shown in FIG. 1 and the compactness the printer device of the present invention has increased the flexibility by which the printer can be incorporated into or assembled with the weighing scale, e.g. in the base unit. Moreover, the printer device and/or printer cassette of the present invention are not restricted to the type of weighing scale shown in FIG. 1 and can find uses in other weighing scale types such as a hanging scale having a suspension point so that it can be hung in use, or in a counter top device. Equally, the printer device and/or printer cassette of the present invention are not restricted to use in a weighing scale and can find uses in other devices that require printing such as a checkout register or simply a standalone printer in which simplicity of loading/unloading the printer cassette is required or advantageous.

Figure 2:
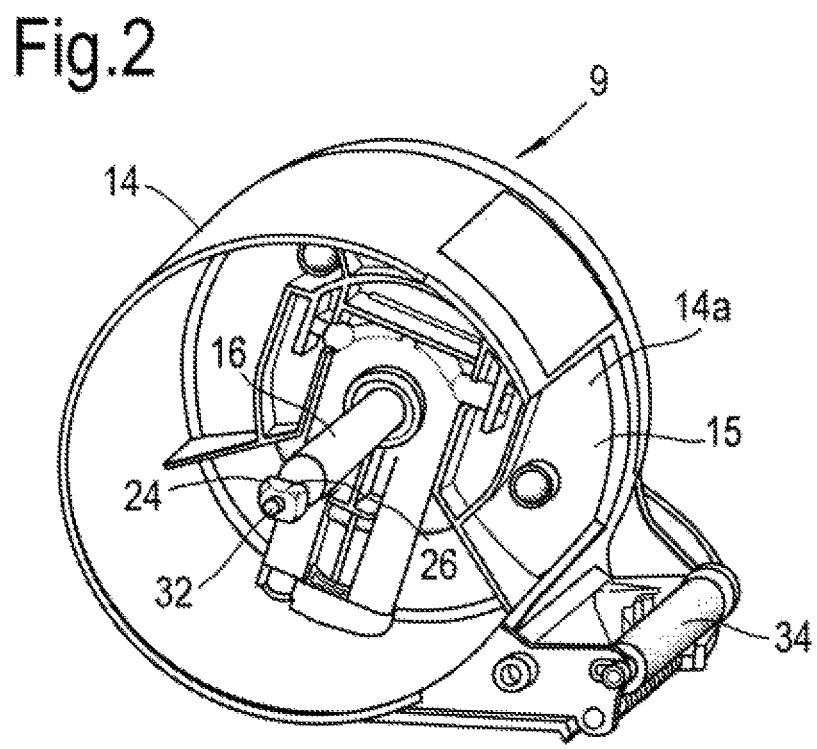
Figure 3:
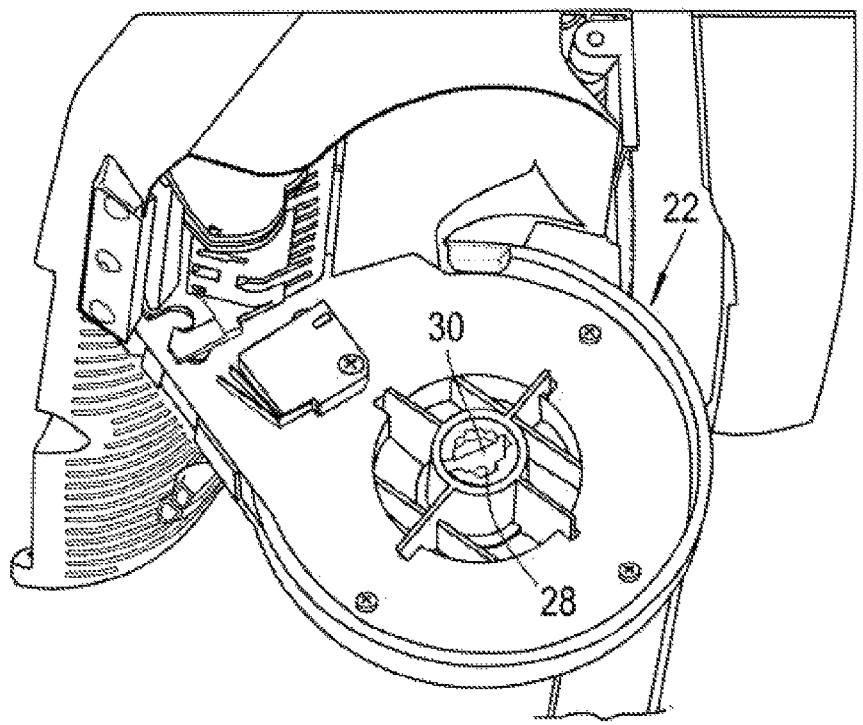

Referring back to the particular embodiment shown in FIG. 1, the printer 1 comprises a printer cassette or cartridge 9 (see FIG. 2) for installing on a printer device 22 (see FIG. 3). The printer cassette shown in FIG. 2 comprises a housing or shell 14 and a pin 16 cantilevered out from the an inner side wall 14a of the printer cassette so as to have a fixed end and a free end for rotationally supporting a supply roll 18 (see FIG. 8). The supply roll 18 is rotatable about an axis defined by the pin 16. This is in contrast to clam shell printers in which the supply roll is seated in a part cylindrical depression in the printer such that the exterior of the supply roll is made to rub against the inner wall of the printer device as it is unwound. As the supply roll is suspended on the pin, any friction between the exterior surface of the supply roll and the inner wall of the printer cassette body has been eliminated, allowing free rotation of the supply roll about its axis. There is no restriction to the pin being mounted to the printer cassette as shown in FIG. 1 as it is equally applicable that the pin can be mounted onto the printer device and the printer cassette can still rotationally engage with the printer device. Alternatively, the printer cassette and the printer device may comprise protuberances or pivoting members which rotatably support the ends of the supply roll when the printer cassette is mounted onto the printer device.

The printer cassette housing or shell can be made transparent so as to allow visual inspection of the supply roll on the pin 16. The printer cassette 9 is removably mounted to or inserted in a printer device 22 of the weighing scale which houses a print-head mechanism by a rotational operation (see FIGS. 3 and 4). Rotational operation could be either performed by rotation of the printer cassette housing 14 or alternatively, rotation of the pin relative to the printer cassette housing. Details of the rotational locking mechanism for rotational engagement with the printer device are discussed further below. The printer cassette housing or shell 14 is substantially cylindrical having a cut out or dispensing portion 15 from which the free end 17 of the supply roll 18 is dispensed as it is unwound from the supply roll (see FIG. 8). The cylindrical body replicates the exterior shape of the supply roll thereby providing a compact, space saving housing. The cylindrical shape of the housing is also particularly well suited to the locking of the printer cassette onto the printer device by a rotational operation as opposed to other shaped housings. However, this is not to say that the exterior housing is restricted to a cylindrical body and any other suitably shaped body can be used so as to allow rotational engagement with the printer device 22. For example, the pin 16 can be made to rotate relative to the printer cassette housing 14. A handle 20 (see FIG. 1) attached to the printer cassette housing 14 actuates the locking or unlocking of the printer cassette from the printer device by a rotational operation. The handle 20 can have an ergonomic design as shown in FIG. 1 to comfortably fit the operator's or user's hand to minimise any discomfort when rotating the printer cassette against a returning force of the locking mechanism. The supply roll can be paper based as typically used for printing receipts or a linerless printing medium typically used for printing labels, or labels on a carrier strip.

The printer unit comprises a rotational locking mechanism such that rotation of the printer cassette body in one direction relative to the printer device locks the printer cassette onto the printer device and rotation the other way relative to the printer device unlocks the printer cassette from the printer device. In the particular embodiment as shown in FIGS. 2 and 3, the rotational locking mechanism comprises a locking member 24 forming the male part in the form of a T-shaped head having flat sides 26 at the distal end of the pin 16 (see also FIG. 5) for insertion into a corresponding locking member 28 forming the female part in the printer device 22. The other end of the pin is rigidly fixed to an inner wall 30 of the printer cassette housing such that rotation of the printer cassette housing rotates the pin. However, it is not necessary that the pin is non-rotatably fixed to the inner wall of the printer cassette housing and it is permissible that the pin is rotatable relative to the printer cassette housing, e.g. by means of being mounted in a bearing. For example, the pin can be directly connected to the handle such that rotation of the handle causes the pin to rotate relative to the printer cassette housing and thereby rotationally engage with the locking mechanism in the printer device.

Figure 4:
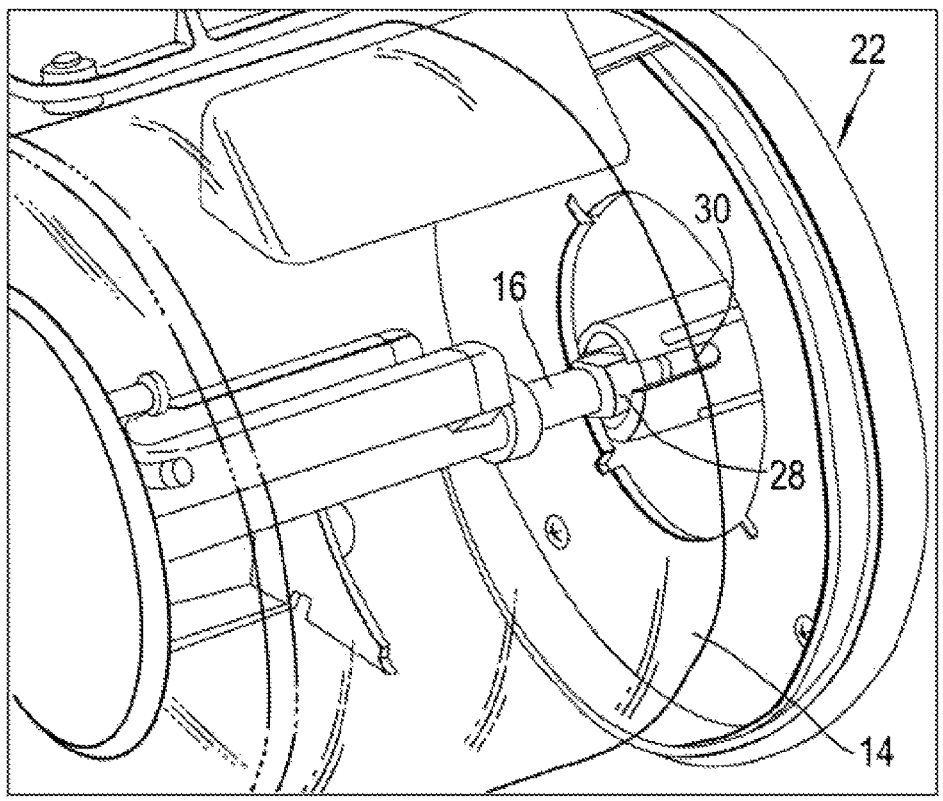
FIG. 4 is a perspective view showing the printer cassette aligned for engagement with the printer device.

Insertion of the male part of the locking member 24 into the female part of the locking member 28 involves aligning the flat sides 26 of the male part 24 in a rectangular slot 30 in the female side 28 (see FIGS. 3 and 4). Beyond the rectangular slot 30 is a cavity (not shown) such that further insertion of the male side 24 into the female side 28, allows it to rotate to cause the T-shaped head to foul against the rectangular slot and thereby lock the male part in the cavity of the printer device. A resilient member (not shown) such as a spring can be used to ensure a tight fit of the printer cassette onto the printer device. For example, insertion of the male part of the locking member into the female part can made against a bias either mounted to the pin or the female part. Alternatively, instead of the T-shaped head forming the male part for insertion into the rectangular slot, the male part can threadingly engage with the female part. For example, threads can be formed at the distal end of the pin so that it can threadingly engages with corresponding threads in the female part. The pitch of the threads can be made such that only a few turns or a partial turn of the printer cassette or pin are necessary to lock the printer cassette onto the printer device. The rotational locking mechanism is not restricted to that shown in FIGS. 2 to 4 and any other rotational locking mechanism that provides a twist lock when rotated is permissible. Although the printer cassette in the particular embodiment shown in FIG. 1, shows a pin which has the dual purpose for rotatably supporting the supply roll and for rotational engagement with the printer device, it is not necessary for the printer cassette of the present invention to comprise a pin in order to provide rotational engagement with the printer device. For example, in addition or alternative to the rotational locking mechanism described above, the rotational locking mechanism can be a bayonet connector commonly known in the art consisting of a male part with one or more pins and a female receptor with matching L slots or part circular slots and optionally spring(s) or other resilient parts to keep the two parts locked together.

To help guide the male part 24 into the female part 28 even if the printer cassette approaches the printer device at an angle, the male part 24 further comprises a location member or pilot 32 (see FIGS. 2 and 5) in the form of a boss or tip to allow the male part 24 to correctly locate into the female part 28, in the particular example, the rectangular slot.

Figure 6:
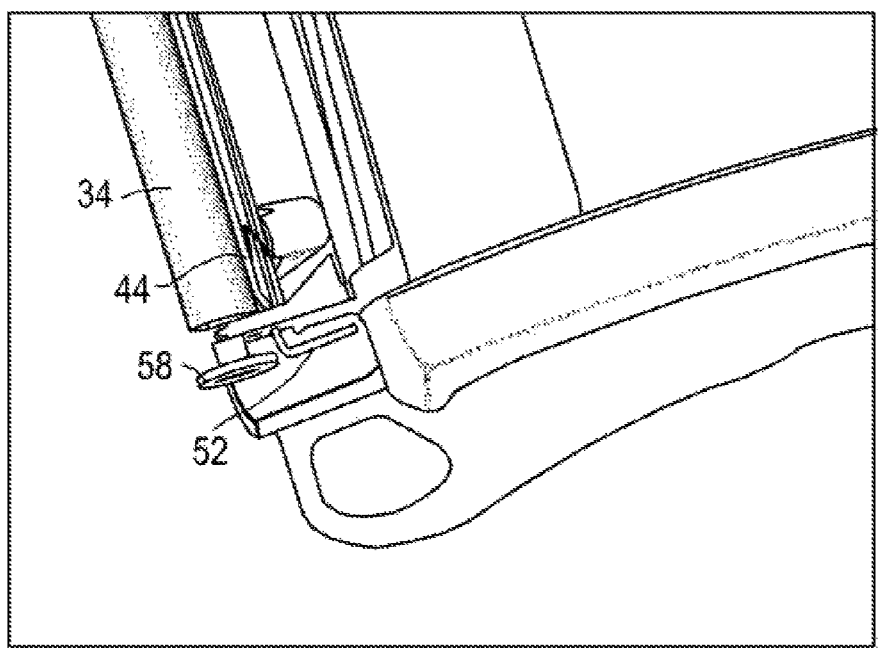
FIG. 6 is a perspective view of the actuator for releasing the positioning member from the drive roller.

In the particular embodiment shown in FIG. 5, the printer cassette comprises a pressure or drive roller 34 which mates in a compression fit with a printer head 50*a* (see FIG. 7) mounted to the printer device. When a supply roll is supported on the pin, the free end portion 17 of the supply roll driven by the drive roller 34 is thereby clamped between the drive roller and the printer head. However, it is not necessary that drive roller is mounted to the printer cassette housing since the present invention can work equally well in reverse, i.e. the drive roller being mounted to the printer device and the print head mounted to the printer cassette housing. In this arrangement, electrical contacts are thus required on the printer cassette to couple with an electrical source in the printer device. In the particular embodiment shown in FIGS. 2 and 5, at least one end of the drive roller is moveable along a slot 36 formed in a sidewall 38 of the printer cassette against a biasing means 40. More precisely, the drive roller is a cylindrical roller made of a compression material typically rubber with a rigid shaft 42 set along the central axis of the drive roller. Each end of the rigid shaft 42 is rotatably set in one or more slots 36 formed in the sidewall 38 of the printer cassette and moveable along the slot 36. At least one slot 36 has an open end for aiding insertion of the roller in the sidewall. The open end of the slot has a detent to prevent the roller for falling out of the slot (see FIGS. 5 and 6). This is to allow the roller to be easily replaced. Alternatively, the slot can have a closed end. The biasing means 40 comprises an elongated positioning member 44 moveably biased towards the drive roller 34 so that it butts up against the drive roller and thereby biases the drive roller in the forward direction towards the open end of the detent slot 36. Thus, instead of the biasing means directly acting on the roller, the biasing means 40 indirectly acts on the roller 34 via the elongated member 44. The positioning member 44 initially positions the roller shaft end at one end of the cassette sidewall slot so that during assembly of the printer cassette with the printer device, at least one end of the drive roller is at a set position where it is easily accepted into an open flared mouth 50*b* at one end of a detent slot 48 in the printer device. Movement of the roller shaft along the cassette sidewall slot 36 against the biasing means provides at least one end of the roller with sufficient play to cooperate with the detent slot 48 in the printer device so that it snap-fits into the detent slot 48 in the printing device. The detent slot 48 has a retaining lip 50 and an angled inner end 51*a*. As the printer cassette is assembled with the printer device, one end of the shaft 42 enters the opening 50*b* of the detent slot. Movement of the shaft end along the detent slot towards the retaining lip 50 causes the roller to butt up and compress against the print head 50*a* by virtue of the resilient rubber material forming the roller. On further rotation of the printer cassette, the angled slot inner end 51*a* causes the end of the shaft to change direction allowing de-compression of the rubber material to move the end of the roller away from the print head so as to be retained in the detent slot end 51*a* as a snap fit. This snap fit engagement also serves as a detent restraining relative rotation between the printer cassette and the printer device, thereby retaining the locking members 24, 28 of the rotational locking mechanism in engagement. A micro-switch 100 mounted onto a wall of the printer device 22 acknowledges assembly of the printer cassette onto the printer device. In the particular embodiment shown in FIG. 7, the micro-switch 100 comprises an outwardly biased lever arm 102 which is arranged to butt up against the printer cassette body when the printer cassette is fully mounted onto the printer device to move the lever arm inwardly against its bias and actuate the micro-switch 100.

When the positioning member butts up against the drive roller, it prevents the roller from freely rotating. To prevent the elongated positioning member 44 permanently being biased against the roller 34 and thereby preventing the roller from freely rotating when assembled with the printer device, the biasing means further comprises an actuator 52 (see FIG. 6) in the form of a lever operatively connected to the elongated positioning member and which is adapted to cooperate with the printer device such that when the printer cassette is assembled with the printer device in the locked position, the elongated positioning member 44 moves away from the roller 34 and when unlocked from the printer device the actuator 50 returns and the elongated member is biased 44 against the roller 34. In the particular embodiment shown in FIG. 6, the elongated member is a bent wire having a continuation at one end to form a lever forming the actuator 50 and a continuation at the other end to form the biasing means, e.g. in the form of a cantilever spring.

As the printing medium is dispensed from the printer cassette body driven by the drive roller, it is fed between the print head and the drive roller. The printer head can be a thermal print head commonly known in the art whereby the printing medium includes a thermally sensitive layer or ribbon. This is preferably used due to the speed at which the printing operation can be performed. While a print head used in the printer device is preferably a thermal printhead, other printing heads such as inkjet printheads may be used. Once printed, the printed portion passes over sharp or serrated edge 54 adjacent the drive roller whereby the printed portion 17 can be torn off (see FIG. 7). In the particular embodiment shown in FIG. 5, the printer cassette further comprises a guide roller 56 beyond the drive roller. Thus, as the print medium passes over the drive roller 34 it is forced to travel over a side of the guide roller 56 furthest from the printing medium supply roll. As the printing medium is unwound from the supply roll, it has a natural tendency to curl back on itself due to the fact that it has been sat on the supply roll and it therefore has a natural tendency to follow a curved path within the printer unit. This becomes more pronounced as the printer medium wound on the supply roll gets low due to the greater curvature adopted by the print medium as a result of the reduced diameter of the supply roll. Without the guide roller 56 adjacent the drive roller 34, the natural curl of the free end of the supply roll might cause the free end to wrap around the drive roller once it exits the printer cassette, or be fed back onto the supply roll within the printer cassette, thereby jamming the printing mechanism. The guide roller 56 forces the printed portion to follow a path away from the printer unit as it is dispensed from the printer cassette and thereby allows the operator to tear the printed portion from the supply roll (see FIG. 8). In the particular embodiment, the guide roller 56 is shown with a sharp ridged or serrated surface. This is to provide a minimum surface contact area with the printing medium and is particularly advantageous where the printing medium has an adhesive backing such as linerless paper described above. The minimum surface contact area between the adhesive backing and the serrated surface of the guide roller 56 not only helps to remove the printing medium from the guide roller but also minimises any disruption or removal of the adhesive from the print medium and thereby minimises loss of its adhesive properties.

The other end of the roller shaft 42 comprises a gear 58 (see FIG. 6) which meshes with a drive gear in the printer device 22 to drive the drive roller 34. Alternatively, the motor to drive the drive roller can be incorporated in the printer cassette body and electrical contacts for coupling with corresponding electrical contacts as discussed above can be provided to establish electrical continuity with an electrical power source. Various other mechanisms to drive the drive roller commonly known in the art are permissible.

To prevent the supply roll from slipping off the pin 16, a stop in the form of a circumferential step 60 is formed around the pin 16 (see FIG. 5). Once supported, a portion of the side of the supply roll butts up against the stop 60 and is thereby prevented from slipping off the pin 16 (see FIG. 8). In addition to preventing the supply roll from slipping off the pin, the stop also helps to centre the supply roll on the pin and the supply roll is thereby prevented from sliding across the pin and rubbing against the interior wall of the printer device during rotation.

Typically the hollow cylindrical core upon which the printing medium is wound comes in a range of sizes depending upon the type of printing medium on the supply roll and the printer head used. For example, the diameter of the core for a simple paper roll for till recepts tends to be smaller than that for linerless paper or adhesive labels on a backing paper or a thermal print medium. To accommodate supply rolls having a different core diameter, the printer cassette further comprises a core adapter 62 (FIG. 9) pivotally mounted to an inner wall 14a of the printer cassette housing 14. The core adaptor 62 has a U-shaped configuration with a lockable pivotable arm 64 at its open end 66. The width of the core adapter 62 is sized to accommodate a larger diameter hollow core of the supply roll. In the stowed position shown in FIG. 2, the core adapter is substantially perpendicular to the pin 16. In use, the core adapter is pivoted from the stowed position to an erect position as shown in FIG. 10 so that the U-shaped element is substantially parallel to the pin. The arm 64 cooperates with the pin 16 to support the core adapter 62 in the erect position (see FIG. 10). To enable the core adapter to be moved from the stowed position to the erect position, the lockable arm allows the pin to pass between the legs of the U-shaped element by freeing the open end 66 of the U-shaped element (see FIG. 9). One end of the lockable arm 64 is pivotally connected to one leg 68 of the U-shaped element so as to be pivotable about the axis of that leg, and the other end has seating means 70 in the form of a depression which is configured to seat around a necked portion 71 of the other leg of the U-shaped element such that in the locked state the open end of the U-shaped element is closed. The lockable arm 64 also has means to cooperate with the pin in the form of a depression 72 which is configured to seat against the pin in the erect position of the core adapter (see FIG. 10). Once erected, the core adapter provides an enlarged "pin" for rotatably supporting the supply roll (see FIG. 11), the pin defining the axis of rotation of the supply roll. The adaptor 62 can be swung away from the pin 16 so that the depression 72 disengages the pin with sufficient clearance to allow the arm 64 to be pivoted aside, opening the free end of the U-shaped adaptor 62. The adapter 62 can then be swung in the opposite direction so that the pin 16 passes between its legs. The lockable arm can then be reclosed and the adaptor continued to be swung in that opposite direction, to a position in which it lies against the inner wall 30 of the printer cassette, at right angles to the pin 16 (FIG. 2).

A housing of the printer cassette can be fabricated from light weight, durable materials such as plastics and due to the simplicity of the printer cassette of the present invention it can be fabricated as a single body using fabrication techniques known in the art such as injection moulding and the pin fixed to the printer cassette housing by insert moulding techniques. Internal scaffolding can be fabricated into the printer cassette housing body to reinforce the housing particularly the area under stress/strain as a result of the rotational force applied to the handle. The U-shaped element of the core adapter which itself can be formed as a single body can be snap fitted to the inner wall of the printer cassette housing by being rotatably set in snap-fit journals protruding from the inner side wall 14a of the printer cassette.

Modern display panels for a weighing scale typically incorporate a touch sensitive screen commonly known in the art so that the user or operator can scroll through numerous pages which for example represent different categories of foodstuffs, e.g. fruit, vegetables, meats etc. In addition to the variable key options provided by the touch sensitive screen, there are a number of key options that do not change (at least after initial setup of the weighing scale) and are considered fixed as they are applicable to all or most of the pages displayed on the touch sensitive screen. These may include a numerical and/or QWERTY key pad and/or a help option. A cost effective approach usually adopted in practice is to provide a separate fixed keyboard panel adjacent the touch screen panel which can be used in combination with the key options provided by the touch sensitive panel as opposed to enlarging the touch sensitive screen to accommodate the fixed keys. Typically, the fixed keyboard panel 74 is located at the base of the touch screen panel 76 as a separate key pad (see FIG. 13). The fixed keyboard panel comprises a key pad 78 and typically is in form of a (usually flexible) overlay strip (usually paper based) on which the key options are printed. The strip is laid over a series of pressure or touch sensitive buttons and is protected by a (usually flexible) screen, transparent for viewing the key options. The strip of material 78 is interchangeable to provide new key options, e.g. to cater for other languages or other initial setups. For this purpose, a pivotable cradle is provided adjacent the display panel which is lowered to receive the overlay strip and raised to a locked position so that the key options are viewable through the transparent screen. An alternative mechanism for incorporating the fixed key pad 78 below the transparent screen is by means of a tray 80 as shown in FIG. 12 which is slidingly received in a slot formed at the base of the operator display panel 10 (the insertion direction shown by the arrow in FIG. 12) so that the tray lies between the protective screen and buttons in the operator display panel 12. The key pad strip is seated in a depression formed in the tray. The bottom wall of the depression is sufficiently flexible so that any finger pressure on the flexible wall is sensed by buttons below in the operator display panel 10. An adhesive or magnetic coupling or a hook and loop fastener can be used to hold the key pad strip securely to the tray and thereby prevent it from moving when installed in the display panel. Alternatively, the tray can be formed with an aperture to allow the buttons in the operator display panel 12 to cooperate with the key options printed on the overlay strip. Once inserted as shown in FIG. 13 so that key options are viewable through the transparent screen, a locking latch can be used to lock the tray to the display panel with the key options printed on the overlay strip in registration with buttons in the display panel 10. A particular advantage with this arrangement is the simplicity and cost effectiveness in providing a fixed key pad adjacent the touch screen without the need to provide a pivotal cradle which is more complex and costly, e.g. requiring a hinge mechanism. The tray can be fabricated as a single body by an injection moulding process.

Whilst a tower arrangement provides advantages in terms of locating the display unit at eye level for the operator or user, the present invention further complements the tower arrangement by providing a display unit with a pivoting mechanism 82 having a realeasable locking mechanism that allows the display unit to rotate or pivot about its axis to a desired orientation and be locked in that position (see FIG. 14). The arrangement shown in FIG. 14 is a close up view of the tower arrangement shown in FIG. 1, whereby the customer display and the operator display are both elevated above the weighing balance by being mounted on a column 8. In the particular embodiment, the operator display unit (not shown) is securely mounted to a base unit 94 which has fittings (not shown) for attaching a display unit, keyboard etc, usually by a snap-fit arrangement in conjunction with a locking member (not shown). The base unit 94 is hingedly connected to the column 8 by the pivoting mechanism 82 which includes a hinge pin 96 to allow the base unit and the operator display panel to be angularly adjustable relative to the column by virtue of the base unit 94 being pivotable about the hinge pin 96 relative to the column. The pivoting mechanism 82 further comprises a ratchet mechanism having a ratchet arm 86 with a pin 88 at its distal end to index past successive ratchet serrations 84 (see FIGS. 14 and 15) in order to angularly adjust the display panel relative to the column. Thus, when the display unit is rotated the pin 88 rides over the serrations 84. To lock the display unit at a desired orientation, the pivotable mechanism further comprises a releasable locking mechanism which comprises a locking handle 90 incorporating a sliding member 92 which is moveable from a retracted position in which it does not interfere with the pin 88, to a forward position above the pin as shown in FIG. 15, to prevent the pin from riding over the serrations. Therefore in the forward position the display unit is locked in a desired orientation and in the retracted position the pin is allowed to ride over the serrations and therefore the display unit can be rotated to a desired orientation.

The invention claimed is:

1. A printer cassette device arranged to be removably mounted to or inserted into a printing device of a weighing scale, the printer cassette is arranged to rotatably support a supply roll when mounted to or inserted into a printing device of a weighing scale, the printer cassette comprises a rotatable locking mechanism for rotational engagement with the printing device characterised in that the rotational locking mechanism for rotational engagement with the printer device is by rotation of the printer cassette device about an axis of rotation of the supply roll such that, in use, rotation of the printer cassette device in one direction locks the cassette to the printer device and rotation of the printer cassette device the other direction unlocks the printer cassette device from the printer device.

2. A printer cassette as defined in claim 1, wherein the printer cassette comprises a pivot member for rotatably supporting a supply roll.

3. A printer cassette as defined in claim 2, wherein the pivot member is a pin, the pin defining an axis of rotation of the supply roll.

4. A printer cassette as defined in claim 3, wherein the rotatable locking mechanism comprises a locking member at the distal end of the pin for rotational engagement with a corresponding locking member in the printing device such that rotation of the pin in one direction locks the cassette to the printer device and rotation of the pin the other direction unlocks the printer cassette device from the printer device.

5. A printer cassette as defined in claim 4, wherein the locking member comprises a T-shaped head receivable in a rectangular slot.

6. A printer cassette as defined in claim 3, wherein the pin comprises a stop for preventing the supply roll sliding off the pin.

7. A printer cassette as defined in claim 1, wherein the rotational locking mechanism is a twist lock or a bayonet connector.

8. A printer cassette as defined in claim 1, wherein the printer cassette device further comprises a pivotable core adapter that cooperates with the pin in the erect position for supporting the supply roll having a greater core diameter than that supported by the pin.

9. A printer cassette as defined in claim 8, wherein the core adapter is substantially U-shape and having a moveable locking arm at its distal end, the locking arm is moveable from a first position so as to allow the pin to move through the core adapter to a second position to secure the pin to the core adapter.

10. A printer cassette as defined in claim 1, wherein the printer cassette further comprises a roller or a print head moveable against a biasing mechanism for respectively coming into compression with the print head or the roller mounted on the printing device when the printer cassette device is locked onto the printing device.

11. A printer cassette as defined in claim 10, wherein at least one end of the roller is rotatably set in a slot in the printer cassette.

12. A printer cassette as defined in claim 10, wherein the roller is moveable against a braking member, the braking member moveable against a bias so that it butts up against the drive roller.

13. A printer cassette as defined in claim 10, wherein said at least one end of the roller is adapted to be snap fitted in a detent slot with an opening along one edge of the detent slot.

14. A printing device comprising a rotational locking mechanism adapted for rotational engagement with a corresponding rotational locking mechanism of a printer cassette device according to claim 1, said rotational locking mechanism comprises a slot arranged to receive a T-shaped head of the printer cassette, wherein the slot comprises a cavity such that further insertion of the T-shaped head into the slot allows the T-shaped head to rotate and foul against the slot and thereby, lock the printer cassette to the printer device.

15. A weighing scale comprising a printing device according to claim 14.

16. A weighing scale as defined in claim 15, wherein the printing device is mounted on a column such that in the normal upright position of the weighing scale the printing device is elevated above a weighing balance.

17. A weighing scale as defined in claim 16, further comprising a display unit pivotably mounted to the column and indexing means arranged to orient the display unit at a desired orientation.

18. A weighing scale as defined in claim 17, wherein the display unit comprises a fixed keyboard panel for receiving a keyboard overlay slideable in the display unit such that the keys in the keyboard overlay are in registration with buttons in the display unit.

19. A weighing scale as defined in claim 15, wherein the weighing scale is a hanging weighing scale having a suspension point so that the weighing scale may be hung in use.

20. A printing device comprising a printer cassette as defined in claim 1.

* * * * *